H. G. GUYON.
Runner for Wheeled Vehicles.
No. 916.                                          Patented Sept. 12, 1838.
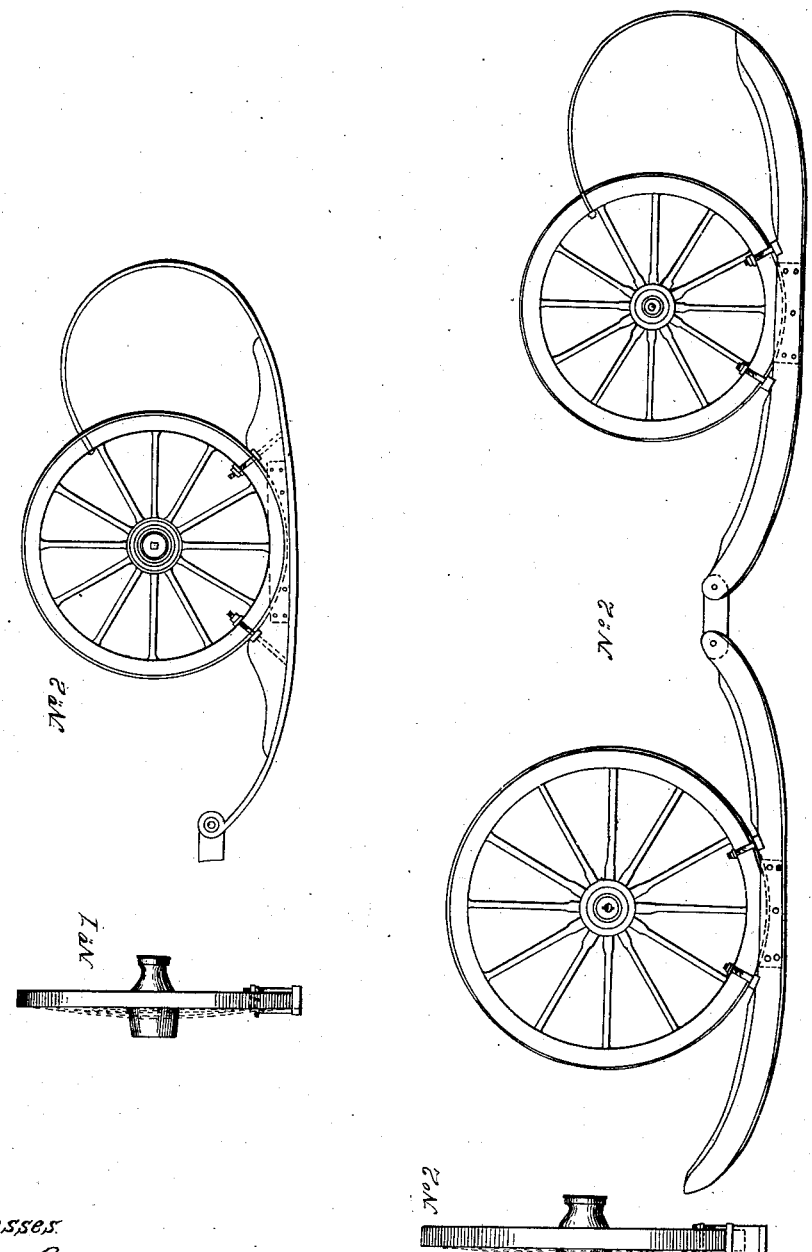

UNITED STATES PATENT OFFICE.

HENRY G. GUYON, OF NEW YORK, N. Y.

MODE OF ATTACHING SLEIGH-RUNNERS TO WHEEL-CARRIAGES.

Specification of Letters Patent No. 916, dated September 13, 1838.

*To all whom it may concern:*

Be it known that I, HENRY G. GUYON, of the city and State of New York, have invented a new and useful Improvement in the Form or Manner of Constructing, Using, and Attaching Runners to Wheel-Carriages, of which the following is a full and exact description.

The nature of my invention consists in making and attaching a peculiar fashioned runner to wheel carriages whereby they may be substituted for sleds for any purpose requiring a sled by placing a runner of wood or iron or part wood and part iron or other metal under each wheel secured by hasps, nuts, &c., (as more fully shown,) that may easily be displaced at pleasure with the least imaginable delay.

To enable others skilled in the arts to make and use my invention (and prevent infringements) I proceed to describe its form, manner of construction, manner of attaching, together with its operation.

The form of each runner to be curved resembling a semi-ellipsis, semi-oval, or semi-circle, elongated as drawings Nos. 1 and 2, and placed under the wheel with the rounding edge downward of suitable width, thickness, and length to correspond with the proportions of the carriage and wheel to which it is intended to be attached, one runner to be placed under each wheel as in drawings Nos. 1 and 2, if the runner is of wood with an iron (or other metal) shoe, the runner must be circled out, in or near the middle or center to suit the periphery of the wheel, which together with an iron plate on each side of the runner riveted through will assist to keep the wheel secure in its proper place (see drawing No. 1). If the runner is of iron (or other metal) chocks or wedges of wood or iron secured to the runner placed before and behind the wheel to keep it in its proper place and support the runner (see drawings No. 2). The runner to be secured to the wheel by grips, crotches, collars, hasps, or bolts, by being secured to the runner or shoe, and passing around the felly and secured with keys, nuts, or hasp (see drawings Nos. 1 and 2) and section No. 2, for grips, crotches, collars, or bolts, for hasps see section No. 1. Part of the runner or shoe to extend forward in front curved up and secured to the wheel in front see drawings Nos. 1 and 2. Carriages having two wheels on a side, the runners must be connected together with a chain or shackle bar with a hole in each end by passing a bolt through each runner and the bar in such a manner as to allow the bar to vibrate or swivel on the bolts as drawings Nos. 1 and 2, thereby allowing the runners to pass over an uneven surface with ease to the carriage.

What I claim as my invention and desire to secure by Letters Patent is—

The attaching of sleigh runners to wheels of carriages in manner substantially as herein described.

HENRY G. GUYON.

Witnesses:
H. BREWSTER,
W. S. M. LAURIER.